May 12, 1959 D. G. HOLLOWAY 2,886,784
PHASE-MODULATORS
Filed April 16, 1956
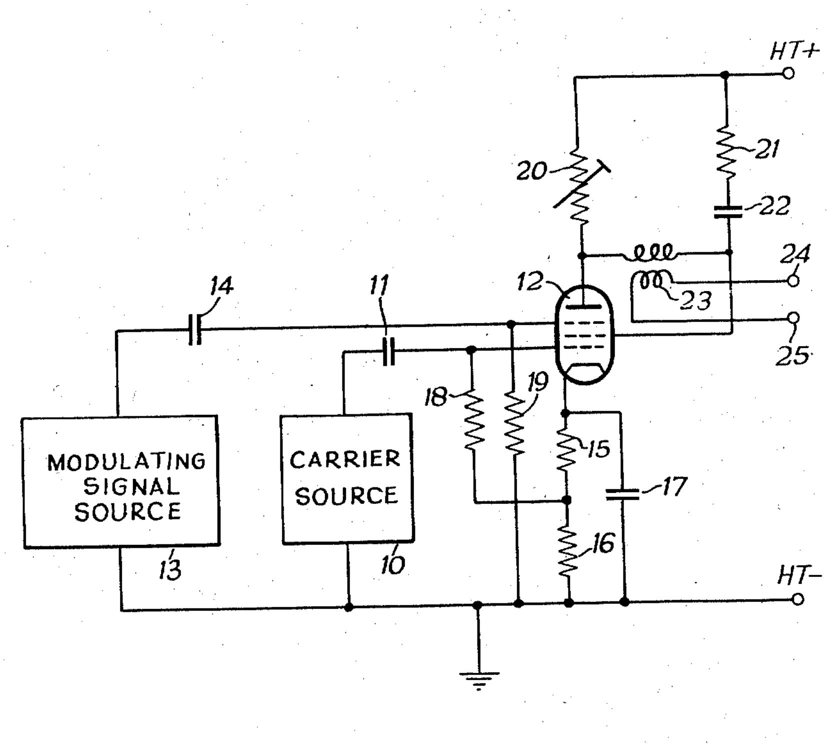
INVENTOR
Dennis G. Holloway
BY Ralph B. Stewart
ATTORNEY United States Patent Office 2,886,784
Patented May 12, 1959

2,886,784

PHASE-MODULATORS

Dennis Godson Holloway, Taplow, England

Application April 16, 1956, Serial No. 578,521

Claims priority, application Great Britain April 29, 1955

3 Claims. (Cl. 332—23)

The present invention relates to phase-modulators.

In my co-pending application Serial No. 223,717 filed April 30, 1951, there is described a phase-modulator comprising two networks which are traversed by like oscillatory carrier currents modulated in anti-phase by a modulating signal. One of the networks comprises a resistive impedance element in series with an inductive impedance element and the other comprises a resistive impedance element in series with a capacitive impedance element. The output circuit is connected between the two networks.

If the two carrier currents are represented by the expressions I and $m$I respectively without modulation and the modulation function is represented by M, the modulated carrier currents may be represented by the expressions $I(1+M)$ and $mI(1-nM)$ respectively, where $m$ and $n$ are constants. If the components in the network including the inductive impedance element are represented by A and $+jY$ respectively and the components in the other network are represented by $a$A and $-ajbY$ respectively where $a$ and $b$ are constants, the difference voltage $(V_1-V_2)$ developed in the output circuit may be represented by the expression:

$$V_1-V_2=I[A(1+M-am+amnM)+jY(1+M+abm-abmnM)] \quad (i)$$

The component of voltage $IA(1+M-am+amnM)$ is in phase with I. If $am$ is made to equal unity the carrier is suppressed whereby the sum of the two side bands remain.

The component of voltage $jIY(1+M+abm-abmnM)$ is in quadrature with I. If $abmn$ is made to equal unity this component of voltage is unmodulated.

Thus it is possible to provide two components, one in the form of an unmodulated carrier phase displaced 90° and the other the side-bands with suppressed carrier. As is well known the summation of two such voltages provides a result in the form of the carrier phase modulated by the modulating voltage and hence a phase modulator of simple construction can be provided.

It is the object of the present invention to provide a phase-modulator which is a development from the phase-modulator hereinbefore described and which is even simpler in construction.

According to the present invention a phase-modulator comprises means for applying a modulating signal to amplitude-modulate in opposite senses two carrier oscillations I and $mI$ respectively of like frequencies and phases, whereby oscillations represented by the expressions $I(1+M)$ and $mI(1-nM)$ are produced, $m$ and $n$ being constants and M being the modulation function, means for passing the oscillations $I(1+M)$ and $mI(1-nM)$ through two networks respectively, and an output circuit connected between the two networks, one of the networks comprising a resistive impedance element of resistance A and the other comprising a resistive impedance element of resistance $a$A and a reactive impedance element of impedance $\pm ajY$ where $a$ is a constant and $j$ is $\sqrt{-1}$, the values of A, Y, $a$, $m$ and $n$ being such that the equation $$-[A^2/Y^2]=1/[(1+amn)(1-am)]$$

is substantially satisfied.

To show that a modulator according to the invention provides a phase-modulated carrier Equation $i$ is rearranged as follows:

$$V_1-V_2=I\{M[A(1+amn)+jY(1-abm)]+[A(1-am)+jY(1+abm)]\} \quad (ii)$$

The expression $M[A(1+amn)+jY(1-abm)]$ of Equation $ii$ represents the side-bands since it falls to zero when M is zero. The expression $$[A(1-am)+jY(1-abm)]$$

of Equation $ii$ represents the carrier since it not influenced by M.

Let the phase angles of these two components be $\alpha$ and $\beta$ respectively.

$$\tan(\beta+\pi/2)=[-1/\tan\beta]$$
$$\tan(\beta-\pi/2)=-1/\tan\beta$$

Thus the condition $$\alpha=(\beta\pm\pi/2) \text{ is given by } \tan\alpha=-1/\tan\beta \quad (iii)$$

From Equation $ii$ $$\tan\alpha=[A(1+amn)]/[Y(1-abm)] \quad (iv)$$

and $$\tan\beta=[A(1-am)]/[Y(1+abm)] \quad (v)$$

Substituting $(iv)$ and $(v)$ in Equation $iii$ the condition $\alpha=(\beta\pm\pi/2)$ is satisfied when $$[A(1+amn)]/[Y(1-abm)]=-[Y(1+abm)]/[A(1-am)]$$

Therefore the said condition is satisfied when $$-[A^2/Y^2]=[(1-abm)(1+abm)]/[(1+amm)(1-am)] \quad (vi)$$

In order to achieve the present invention one of the reactive impedances is made zero. This may be done in Equation $vi$ by putting $b=0$.

Thus $$-[A^2/Y^2]=1/[(1+amn)(1-am)] \quad (vii)$$

It will be appreciated that if the two carrier currents $I(1+M)$ and $mI(1-nM)$ are identical, that is, if $m$ and $n$ each equal unity Equation $vii$ simplifies to $$-[A^2/Y^2]=1/(1-a^2) \quad (viii)$$

The squared form of the left-hand side of Equations $vii$ and $viii$ shows that the sole reactive impedance element can be either inductive or capacitive.

In one embodiment of the invention the means for applying the modulating signal to amplitude-modulate in opposite senses the two carrier oscillations I and $m$I respectively of like frequencies and phases, comprise an electron discharge valve having a cathode, a control electrode, two electron-collecting electrodes and a modulator electrode adapted to vary the division of current to the two electron-collecting electrodes differentially in response to a modulating signal, means for applying an oscillatory carrier voltage between the control electrode and cathode of the valve, and means for applying a modulating signal between the modulator electrode and the cathode of the valve, one of the said networks being connected between the positive terminal of a source of anode current and one of the said electron-collecting electrodes, and the other network being connected between the said positive terminal and the other of the said electron-collecting electrodes. The electron discharge valve may be a pentode in which the anode and screen grid constitute the two electron-collecting electrodes respectively and the suppressor grid constitutes the modulator electrode.

The invention will now be described, by way of example, with reference to the accompanying drawing which is a circuit diagram of a phase modulator.

In the drawing a source 10 of carrier oscillations has one terminal connected through a capacitor 11 to the control grid of a pentode valve 12, the other terminal of the carrier source being connected to earth. A source 13 of modulating signals has one terminal connected through a capacitor 14 to the suppressor grid of the valve 12, the other terminal of the source 13 being connected to earth.

The cathode of the pentode valve 12 is connected through two bias resistors 15 and 16 in series to earth, these resistors being shunted by a radio-frequency by-pass capacitor 17. Bias voltage is applied to the control grid of the valve 12 through a resistor 18 and to the suppressor grid through a resistor 19.

The anode of the valve 12 is connected through a preset resistor 20 to the positive terminal HT+ of a source (not shown) of anode current the negative terminal HT— of the source being connected to earth. A resistor 21 and a capacitor 22 are connected in series between the terminal HT+ and the screen grid of the valve 12. Between the anode and screen grid of the valve 12 there is connected the primary winding of a transformer 23 whose secondary winding is connected to two output terminals 24 and 25.

It will be appreciated that the currents at carrier frequencies flowing in the anode and screen grid circuits are in phase with one another and the effect of varying the potential of the suppressor grid by applying signals thereto from the signal source 13 is to vary differentially the amplitudes of the currents flowing to the anode and screen grid. Thus the carrier currents in the anode and screen grid circuits are amplitude-modulated in anti-phase relatively to one another. The direct current path for the screen grid current is through the primary winding of the transformer 23 and the resistor 20 to the terminal HT+. The major part of the alternating component of the screen grid current flows through the capacitor 22 and the resistor 21.

The values of the resistors 20 and 21 and the capacitor 22, to provide a true quadrature condition, are 8 kilo-ohms, 10 kilo-ohms and 160 pf. respectively for a carrier frequency of 200 kc./s. It will be appreciated that the value of 8 kilo-ohms for the resistor 20 is only nominal and the setting of this resistor will have to be adjusted slightly to take account of the effect of the valve 12 in the circuit. The component values given are for the case where $m=n=1$ in Equation *vii* whereby the conditions of Equation *viii* are obtained.

I claim:

1. A phase-modulator, comprising a source of carrier oscillations of fixed frequency, a circuit network energized under the control of said source and producing in two circuit paths two carrier oscillations I and $mI$ respectively of the fixed frequency of said source and of like phases, a source of modulating signals, modulating means controlled by said modulating signals to amplitude-modulate said carrier oscillations in anti-phase and producing oscillations represented by the expressions $I(1+M)$ and $mI(1-nM)$, $m$ and $n$ being constants and M being the modulation function, one of said circuit paths being substantially entirely resistive and comprising a resistance A connected between a first terminal and a second terminal, the other circuit path being reactive and connected between said first terminal and a third terminal and comprising a resistance $a$A in series with a reactance $\pm ajY$, $a$ being a constant and $j$ being $\sqrt{-1}$, and an output circuit connected between said second and third terminals and being responsive to the vector difference between the voltages developed across said two circuit paths, A, Y, $a$, $m$, and $n$ having values substantially to satisfy the equation $$-[A^2/Y^2]=1/[(1+amn)(1-am)]$$

2. A phase modulator according to claim 1, wherein the modulating means for applying the modulating signal to amplitude-modulate in opposite senses the two carrier oscillations I and $m$I respectively of like frequencies and phases, comprise an electron discharge valve having a cathode, a control electrode, two electron-collecting electrodes and a modulator electrode adapted to vary the division of current to the two electron-collecting electrodes differentially, means for applying an oscillatory carrier voltage from said source between the control electrode and cathode of the valve to produce the said two carrier oscillations in the circuits of the said electron-collecting electrodes, and means for applying the said modulating signals between the modulator electrode and the cathode of the valve, one of the said circuit paths being connected between the positive terminal of a source of current and one of the said electron-collecting electrodes, the other circuit path being connected between the said positive terminal and the other of the said electron-collecting electrodes, and said output circuit being connected between said two electron-collecting electrodes.

3. A phase-modulator according to claim 2, wherein the said valve has an anode, a suppressor grid and a screen grid in addition to a control electrode and cathode, the anode constituting one of the electron-collecting electrodes the screen grid constituting the other of the electron-collecting electrodes and the suppressor grid constituting the modulator electrode.

References Cited in the file of this patent

UNITED STATES PATENTS

| | | |
|---|---|---|
| 2,356,483 | Travis | Aug. 22, 1944 |
| 2,408,684 | Roberts | Oct. 1, 1946 |